United States Patent

[11] 3,604,392

| [72] | Inventors | Chisato Kawazoe |
| | | Tokyo; |
| | | Terumichi Ichiba, Kanagawa; Hiroyuki Kumamaru, Kanagawa; Toshio Motegi, Kanagawa, all of, Japan |
| [21] | Appl. No. | 790,140 |
| [22] | Filed | Jan. 9, 1969 |
| [45] | Patented | Sept. 14, 1971 |
| [73] | Assignee | Sumitomo Electric Industries Ltd. Kitahama, Higashi-ku, Osaka, Japan |
| [32] | Priority | Jan. 1, 1968 |
| [33] | | Japan |
| [31] | | 43/694 |

[54] APPARATUS FOR MANUFACTURING A PLASTIC INSULATED WIRE
3 Claims, 10 Drawing Figs.

[52] U.S. Cl. .................................................. 118/67,
118/69, 118/313, 118/506
[51] Int. Cl. ...................................................... B05c 11/00
[50] Field of Search ........................................... 118/69,
109, 122, 125, 126, 33, 66, 67; 117/128

[56] References Cited
UNITED STATES PATENTS

| 246,728 | 9/1881 | Crich et al. | 118/109 |
| 426,420 | 4/1890 | Swaine et al. | 118/69 X |
| 632,656 | 9/1899 | Lewis | 118/109 X |
| 2,287,825 | 6/1942 | Postlewaite | 118/69 X |
| 2,393,023 | 1/1946 | Cox et al. | 118/69 |
| 2,521,807 | 9/1950 | Sutherland et al. | 118/109 X |
| 2,763,275 | 9/1956 | Cummings | 118/69 X |
| 3,251,708 | 5/1966 | Schmetterer et al. | 118/69 X |

FOREIGN PATENTS

| 993,566 | 5/1965 | Great Britain | 117/21 |

*Primary Examiner*—Morris Kaplan
*Attorney*—Sughrue, Rothwell, Mion, Zinn & Macpeak ABSTRACT: A water spray and water-filled means are positioned in tandem intermediate of a melted plastic insulation extruder which concentrically coats a moving conductor and the coated wire takeup means. A liquid bath or wet sponge contacts the cooled plastic insulated wire to suppress lateral vibration.

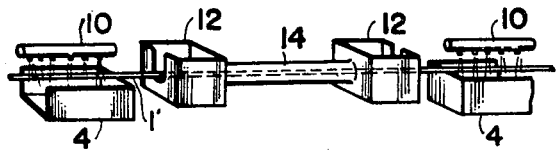
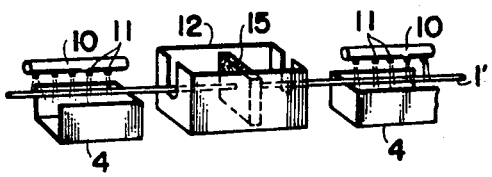
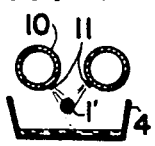  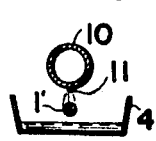
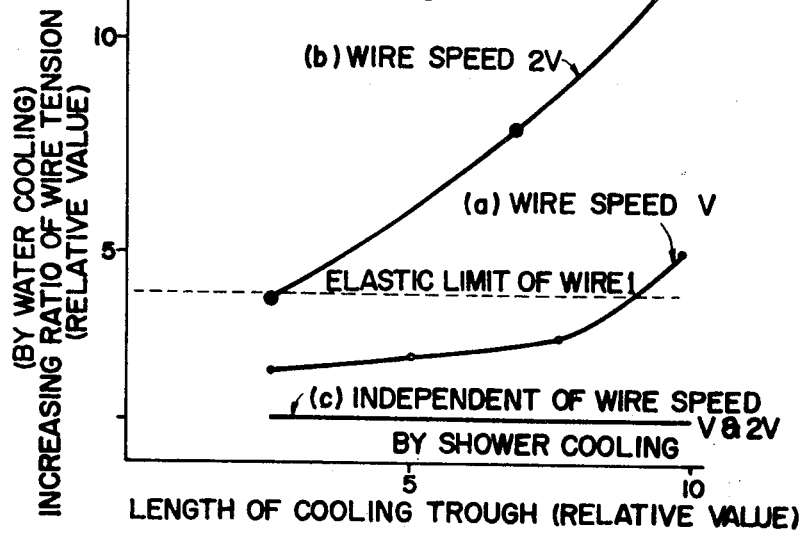

3,604,392

APPARATUS FOR MANUFACTURING A PLASTIC INSULATED WIRE

BACKGROUND OF THE INVENTION

1. Field of the Invention

This invention relates to an apparatus for manufacturing a plastic insulated wire for communication cables or the like and more particularly to an apparatus which includes means for cooling the plastic insulation material subsequent to concentrically extruding the same about the moving wire to solidify the insulation prior to coiling of the insulated wire.

2. Description of the Prior Art

Customarily, in manufacturing a plastic insulated wire the plastic material is extruded for concentric coating of the moving wire conductor while it is in the fluid and heated state and subsequently solidified by cooling the same as a result of passing through a water-filled trough downstream of the extruder. In such conventional apparatus, there is an inherent defect since, if the running speed of the insulated wire in the cooling water is increased, the frictional resistance due to the viscosity of the water in the trough increases which increases the wire-pulling tension at the exit end of the cooling trough. If the wire-pulling tension increases beyond an admissible limit, the elastic limit of the wire is exceeded and the wire is stretched during manufacture.

SUMMARY OF THE INVENTION

The present invention is directed to an apparatus for manufacturing a plastic insulated wire which allows the wire to be manufactured at high speed without the aforementioned defects of the conventional process and the present invention is characterized by the employment of a spray-cooling system to solidify the extruded plastic insulating material. The present invention also solves the problem of wire vibration during the running of the same at high speed in the spray-cooling system to ensure the production of a plastic insulated wire of uniform insulation thickness.

BRIEF DESCRIPTION OF THE DRAWINGS

FIG. 5 is a schematic, perspective view of yet another embodiment of the present invention.

FIG. 6 is a schematic, perspective view of another embodiment of the present invention.

FIG. 7 is an end, sectional view of a water spray apparatus employed by the present invention.

FIG. 8 is an end, sectional view of yet another water spray apparatus which may be used with the present invention.

FIG. 9 is an end, sectional view of yet another type of spray apparatus which may be used with the present invention.

FIG. 10 is a graph showing the comparison in performance of the apparatus of the present invention as contrasted to a conventional apparatus of FIG. 1 and comprises a plot of wire tension versus the length of cooling trough for solidifying the insulation.

DESCRIPTION OF THE PREFERRED EMBODIMENTS

Figure 1:
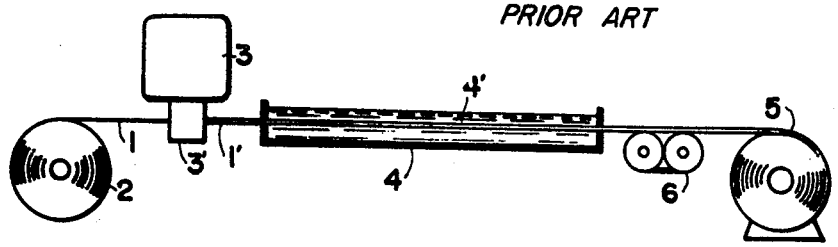
FIG. 1 is a schematic view of a conventional apparatus for the manufacture of a plastic insulated wire with the wire passing through a cooling trough filled with water.

The prior art is exemplified in FIG. 1 in which customarily, in manufacturing a plastic insulated wire, a conductor 1 which is paid off from a payoff device 2 is concentrically coated with an insulating layer of plastic at the extruding head or so-called crosshead 3' of an extruder 3 to form the plastic insulated wire 1'. The insulated wire 1' is cooled and solidified by passing the same through a conventional cooling trough 4. The pulling capstan 6 pulls the coated and solidified wire 1' from left to right where it is taken up by winder 5. When the insulated wire 1' passes through the cooling water 4' which fills the conventional trough 4 at high speed, the pulling tension on the insulated wire 1' increases strikingly due to the viscosity resistance of the cooling water. The running wire 1' also creates high turbulence in the cooling water 4' which extends throughout the trough 4.

The wire-pulling tension increases abruptly in accordance with the increase in wire speed and might exceed the elastic limit of conductor 1 in which case, an undesirable stretching of conductor 1 occurs. In other words, the wire speed during manufacture is limited in the conventional cooling apparatus under the prior manufacturing techniques. In the present invention, it is found that a cooling device of the spray type is much more effective as a means to prevent the wire-pulling tension from increasing at higher speed to such an extent that stretching of the wire conductor occurs while at the same time at high speeds sufficient cooling effect is achieved.

Figure 2:
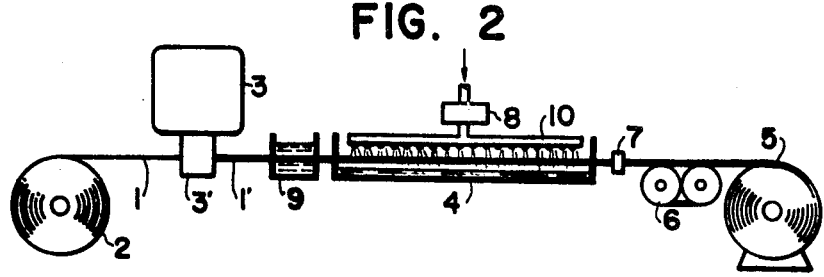
FIG. 2 is a schematic view of one embodiment of the present invention with the plastic coated wire passing through a water spray apparatus after passing first through a short trough filled with cooling water.

In FIG. 2, which is an embodiment of the present invention the insulated wire 1' is cooled by water spray which pours from the spraying device 10 with the cooling water coming out from at least a row of longitudinally spaced slits or holes 11 to form a water film or spray, FIG. 9, with some portions of the water spray contacting the outer surface of the insulated wire 1' performing the necessary heat exchange with the hot plastic wire insulation to cool the same. On the other hand, the other portions of the water spray which do not contact the wire insulation surface fall into the trough 4 which receives the same and acts as a drain for the accumulated cooling liquid.

By a repetition of the cooling process in which the water spray comes out from the plurality of slits or holes, it takes the temperature of the wire insulation below its deformation temperature before the insulated wire 1' contacts the pulling capstan 6. The water emanates from water feed device 8. In a spray-cooling device of the present invention, the portion of the cooling water spray which does not contact the insulated wire 1' and, therefore, does not contribute to the cooling operation of the wire insulation is not subjected to agitation and acceleration due to the high speed of running of the insulated wire 1' so that there occurs no undesirable increase in wire-pulling tension under the system of the present invention. Since the increase in wire-pulling tension is only slight at a relatively high increase in speed of wire movement, no undesirable conductor stretch occurs maintaining the elongation property of the insulated wire constant and at a nil value.

However, there is a possible defect in the basic spray-cooling system of the present invention. Namely, if the insulated wire 1' is pulled at high speed without any support means provided between the exit of the crosshead 3' of the extruder 3 and the pulling capstan 6, for instance in FIG. 2, the insulated wire 1' is liable to vibrate laterally of the water-spraying device 10.

If the wire vibrations are serious, the wire running speed fluctuates at each moment with the fluctuations being proportional to the amplitude of wire vibration. Since the extruding rate of plastic at extruder 3 is necessarily severely constant over a short time, the net quantity of plastic coated over the surface of conductor 1 and, therefore, the wall thickness of the insulated wire 1' fluctuates at a rate inversely proportional to the wire running speed at each moment at which the insulated wire 1' leaves the exit side of crosshead 3'. Since the wall thickness of the wire insulation is required to be uniform the key of a successful spray cooling system for commercial use lies in the suppression of the wire vibration by some means. According to experimentation, it is very effective to add the vibration suppression means to the water-spraying device 10 at a location in the area of receiving trough 4 which exists between the exit end of the crosshead 3' and the pulling capstan 6. It has been found especially effective for suppressing wire vibration to provide a suppression means 9 for instance in the apparatus of FIG. 2 at the exit end of the crosshead 3', although this is less effective than a placement of the same means 9 in the neighborhood of the center of the water-spraying device 10 in the embodiment shown in FIG. 3.

Figure 4:
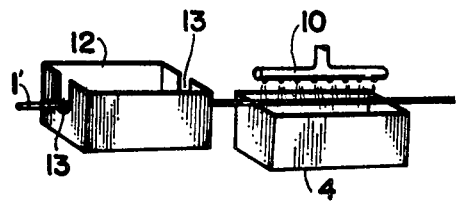
FIG. 4 is a perspective view of a portion of the apparatus shown in FIG. 2.

As additional explanation, with respect to the apparatus of FIG. 2, the water feeder 8 has a filter which is connected with the water-spraying means 10 for supplying the water spray. The row of multiple slits or holes in the spray means 10 is disposed along the length of the running insulated wire 1'. The trough 4 for receiving and draining the water spray 11 is disposed below the spray means 10. If the means 10 consists of one or a plurality of pipes, the pipes are provided with the multiple slits or holes for spraying water. Any one of the water-spraying devices 10 as shown in FIGS. 7, 8 or 9 may be used, depending upon the preference of the manufacturer. In FIG. 4, the means 9 for suppressing wire vibration is illustrated in detail. In this embodiment the suppressing means 9 consist of a water-filled trough 12. There are provided slits at both ends through which the insulated wire 1' passes. In operation, cooling water fills the trough 12 to such a degree that the insulated wire 1' is soaked (not shown) and surplus water flows out of the slits 13 into a drain (not shown). It is, of course, necessary that the trough 12' be sufficient in length to prevent lateral vibration of the moving wire 1' but not so long as to appreciably increase the wire-pulling tension. The performance of an alternate apparatus of the present invention will next be explained. In FIG. 2, cooling water in passing through a plurality of slits or holes formed in the water feedpipe 10 for example, changes into spray and falls onto the insulated wire 1' after it leaves the water-filled bath 9. As is well known, a water bath effectively prevents the wire from laterally vibrating as it passes through the water bath because the water, in filling the bath, effectively absorbs the vibrating energy of the passing wire. In FIG. 2, the wire vibration is suppressed in a vicinity of the exit of crosshead 3' where the wire-running speed is kept constant without any fluctuation and the result is to manufacture a uniformly plastic insulated wire.

In other words, even though the insulated wire 1' vibrates in lateral directions by collision with the waterdrops of spray, the vibration energy is immediately absorbed by the viscosity resistance of the water in the bath 12, and in fact, there is hardly no vibration so that the momentary speed fluctuation of the insulated wire 1' as it passes the crosshead 3' of the extruder 3 is completely suppressed. After removal by air wiper 7 of that portion of water which is still attached to the insulating wire 1' as it moves from the spray apparatus, the insulated wire 1' contacts capstan 6 which pulls the same through the coating and cooling apparatus and moves it to winder 5 where the wire is taken up.

Figure 3:
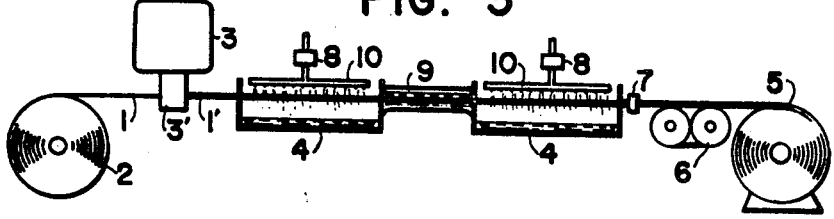
FIG. 3 is a schematic view of another embodiment of the present invention employing multiple water spray means separated by a short trough filled with cooling water.

In FIG. 3, there is provided a plurality of water-spraying devices 10 with individual water-feeding devices 8 and troughs 4 while the vibration-suppressing means 9 is provided at a location between the water-spraying devices 10. In other respects, FIG. 3 is no different from that of FIG. 2. Various alternative types of vibration-suppressing means are illustrated in FIGS. 5 and 6. The devices 14 and 15 shown in FIGS. 5 and 6 are preferably applicable to the apparatus of FIG. 3 and substituted for the means 9. In both FIGS. 5 and 6, 1' denotes the insulated wire, while the water-receiving and draining troughs are identified at 4, the water-spraying pipes at 10 and the water baths at 12 respectively. In FIG. 5 a water-filled pipe 14 or a water-filled trough whose upper face opens in V-shape (not shown) absorbs the energy of lateral wire vibration which runs at high speed and may connect the two troughs 4 with each other. A device 14 if required, may be used as an electrode or like measuring device for measuring the coaxial capacitance of insulated wire 1'.

FIG. 6 is a modification of the arrangement shown in FIG. 5 in which a wet sponge 15 or the like impregnated with water supports the insulated wire 1' and the light frictional force acts against the surface of the insulated wire 1' to maintain the same in loose contact. The arrangement is similar to that of FIG. 2 in that the total length of the device 9 shown in FIG. 3 is shorter as compared with that of the water-spraying pipes 10. Thus, when the insulated wire 1' runs through the device 9, it is held at a position in soft contact by a cooling liquid such as water or a sponge 15 so that the energy of the lateral wire vibration is effectively damped and absorbed. Besides, since the total length of the device 9 in either form is extremely short, it barely contributes to an increase in the pulling tension on the insulated wire 1'.

Of course, the vibration-suppressing device 9 may be disposed not only at the location between a plurality of troughs 4, but at any location such at the end just before the pulling capstan 6 if desired.

Hereinbefore, the construction and action of the present invention is described. Hereinafter, the differences in manufacturing insulated wires according to a conventional apparatus such as that shown in FIG. 1 and that of the present invention such as that shown in FIGS. 2 and 3 will be explained with respect to experimental data shown in the graph of FIG. 10. The abscissa of FIG. 10 represents the relative length of cooling trough and the ordinate represents wire-pulling tension due to the turbulence of the water in the cooling system. The characteristic curves (a) (b) correspond to cases where the wire-pulling speeds of the insulated wire 1' are V and 2V respectively wherein a conventional cooling trough carrying a cooling liquid is used. On the other hand, the characteristic curve (c) occurs when an apparatus of the type of the present invention such as that shown in FIGS 2 or 3 is used. In general, it takes some time to cool and solidify melted plastic over a wire conductor so that there is a lower limit in the length of cooling trough in any case and the lower limit increases proportionally to wire-pulling speed V. If the lower limit requires a relative length 5 as in FIG. 10 when the wire speed is V, it must increase up to a relative length "10" when the wire speed is 2V. From this point of view, if a cooling trough of conventional construction is used holding cooling water, a stretching of the wire will take place at a wire speed a little lower than V in the case of a relative length of cooling trough of "10." In the present invention, however, it is understood that, even though the wire speed is higher than 2V wire stretching does not occur. Consequently, if an apparatus of the present invention is used, an allowable upper limit of wire speed is not imposed by the length of the cooling system but, by the other mechanisms employed in the wire manufacturing line.

The present invention provides concrete means for increasing wire speed during the coating of the same with a plastic insulated material with no undesirable stretch in the conductor nor any fluctuation in the insulated thickness.

What is claimed is:

1. In an apparatus for manufacturing a plastic coated conductor comprising conductor payoff means, means for successively coating melted plastics about said conductor, a pulling capstan and means for spooling said coated conductor, the improvement comprising:

a pair of longitudinally spaced water-spraying devices operatively positioned with respect to said coated conductor between said melted plastics coating means and said pulling capstan for cooling said melted plastics, and means intermediate said spaced water-spraying means in contact with said coated conductor for suppressing lateral vibration of the coated conductor due to impact of the water spray on the moving conductor, said vibration-suppressing means being shorter in total length than the combined length of said water-spraying devices.

2. The apparatus as claimed in claim 1, wherein said vibration-suppressing means comprises a water-filled trough.

3. The apparatus as claimed in claim 1, wherein said vibration-suppressing means comprises a water-filled sponge.